(12) United States Patent
Blake et al.

(10) Patent No.: US 10,658,793 B2
(45) Date of Patent: May 19, 2020

(54) REVERSIBLE POWER AND DATA CONNECTOR ASSEMBLY

(71) Applicant: Canary Connect, Inc., New York, NY (US)

(72) Inventors: Robert Blake, New York, NY (US); Matthew Rao, Massapequa Park, NY (US); David Ye, West Babylon, NY (US)

(73) Assignee: Canary Connect, Inc., New York, NY (US)

( * ) Notice: Subject to any disclaimer, the term of this patent is extended or adjusted under 35 U.S.C. 154(b) by 0 days.

(21) Appl. No.: 16/318,744

(22) PCT Filed: Jul. 14, 2017

(86) PCT No.: PCT/US2017/042046
§ 371 (c)(1),
(2) Date: Jan. 18, 2019

(87) PCT Pub. No.: WO2018/017402
PCT Pub. Date: Jan. 25, 2018

(65) Prior Publication Data
US 2019/0288453 A1    Sep. 19, 2019

Related U.S. Application Data

(60) Provisional application No. 62/365,125, filed on Jul. 21, 2016.

(51) Int. Cl.
*H01R 11/30* (2006.01)
*H01R 13/64* (2006.01)
(Continued)

(52) U.S. Cl.
CPC ............... *H01R 13/64* (2013.01); *G06F 1/18* (2013.01); *H01R 13/5219* (2013.01); *H01R 13/6205* (2013.01); *H01R 13/6683* (2013.01)

(58) Field of Classification Search
CPC ............... H01R 13/64; H01R 13/6683; H01R 13/6205; H01R 13/5219; G06F 1/18
(Continued)

(56) References Cited

U.S. PATENT DOCUMENTS 6,356,958 B1 *   3/2002  Lin ..................... H01L 22/20
                                                    257/666
6,405,139 B1 *   6/2002  Kicinski ............. H01R 13/533
                                                    439/208

(Continued)

OTHER PUBLICATIONS

International Search Report for PCT/US17/42046, dated Oct. 5, 2017.
(Continued)

*Primary Examiner* — Abdullah A Riyami
*Assistant Examiner* — Nelson R. Burgos-Guntin
(74) *Attorney, Agent, or Firm* — Sheehan Phinney Bass & Green PA

(57) ABSTRACT

A system includes a first electrical connector and a first multiplexer. The first electrical connector has multiple electrical contacts including at least a first data contact, a second data contact, a first power contact and a second power contact. The first multiplexer has a first data input, a second data input and a selector. The first data input is coupled to the first data contact. The second data input is coupled to the second data contact. The selector is coupled to the first power contact or the second power contact. The first multiplexer is configured to; direct the first data input to a first bus and direct the second data input to a second bus, or direct the first data input to the second bus and direct the second data input to the first bus, depending whether a voltage is present at the selector.

27 Claims, 6 Drawing Sheets

(51) Int. Cl.
  *G06F 1/18* (2006.01)
  *H01R 13/52* (2006.01)
  *H01R 13/62* (2006.01)
  *H01R 13/66* (2006.01)

(58) Field of Classification Search
  USPC .......................... 439/68, 660, 676, 39, 488
  See application file for complete search history.

(56) References Cited

U.S. PATENT DOCUMENTS

| | | | |
|---|---|---|---|
| 6,815,966 B1* | 11/2004 | Gunn | G01R 31/2863 324/750.05 |
| 7,311,526 B2 | 12/2007 | Rohrbach et al. | |
| 7,517,222 B2 | 4/2009 | Rohrbach et al. | |
| 7,645,143 B2 | 1/2010 | Rohrbach et al. | |
| 7,901,216 B2 | 3/2011 | Rohrbach et al. | |
| 8,087,939 B2 | 1/2012 | Rohrbach et al. | |
| 8,177,560 B2 | 5/2012 | Rohrbach et al. | |
| 8,435,042 B2 | 5/2013 | Rohrbach et al. | |
| 8,690,582 B2 | 8/2014 | Rohrbach et al. | |
| 8,951,248 B2* | 2/2015 | Messerly | A61B 18/1206 606/34 |
| 9,112,304 B2 | 8/2015 | Rohrbach et al. | |
| 2004/0045330 A1* | 3/2004 | Moon | E05B 47/0673 70/107 |
| 2005/0284200 A1* | 12/2005 | Moon | E05B 47/0673 70/278.2 |
| 2007/0077791 A1* | 4/2007 | Su | G06F 13/4081 439/76.1 |
| 2008/0164934 A1* | 7/2008 | Hankey | H01R 13/2428 327/407 |
| 2008/0166907 A1* | 7/2008 | Sanford | H01R 43/24 439/345 |
| 2009/0267613 A1* | 10/2009 | Terlizzi | G06F 13/385 324/538 |
| 2012/0148195 A1 | 6/2012 | Umeno | |
| 2013/0244491 A1* | 9/2013 | Sarwar | H01R 24/60 439/655 |
| 2014/0073188 A1* | 3/2014 | Fritchman | G06F 1/1632 439/620.21 |
| 2015/0263467 A1* | 9/2015 | Austermann, III | H04B 3/54 439/676 |
| 2015/0309007 A1* | 10/2015 | Bellotti | G01N 29/348 73/597 |
| 2016/0111811 A1 | 4/2016 | Liu et al. | |
| 2018/0054667 A1* | 2/2018 | Yamkovoy | H04R 1/1041 |
| 2019/0007230 A1* | 1/2019 | Nori | H04L 12/2803 |
| 2019/0288453 A1* | 9/2019 | Blake | H01R 13/64 |

OTHER PUBLICATIONS

Amazon.com; Secure Deep Fryer Magnet Power Cord, Mar. 2012; printed from Internet Aug. 18, 2016.
Daniel Rubino; "Surface Pro 3's new and improved power connector makes charging a breeze"; http://www.windowscentral.com/surface-pro-3-new-and-improved-ac-connector; May 2014; printed from Internet Aug. 18, 2016.
Dowell Trading.Co. Ltd. "News for "Break Away" Power Cords on Electric Deep Fryers"; Jul. 2001; http://www.dowell.com.hk/breakawaycord_news.htm; printed from Internet Aug. 18, 2016.
CNN.com: "Break-away cord aims to make deep fryers safer"; Jul. 2001; http:llcrn.allpolitics.printthis.clickability.com; printed from the internet Aug. 18, 2016.
CHARD; Deep Fryer Use and Care Instructions; Feb. 2013.
Garmin; USB Charging Cable; https://buy.garmin.com, downloaded from the Internet Aug. 18, 2016.
Griffin Technology; BreakSafe Magnetic USB-C Power Cable; https://griffintechnology.com/us/breaksafe-magnetic-usb-c-power-cable; downloaded from the Internet Aug. 18, 2016.
Stanley; Stanley 30311 Safety Socket; https://www.amazon.comlstanley-3 03 1 1 -Safety-Socket/dp/B0081BCGH8; downloaded fromthe Internet Aug. 18, 2016.
Znaps; Lighting Set A; htçs://www.znaps.netl collections/lightning-version; downloaded from the Internet Aug. 18, 2016.

* cited by examiner

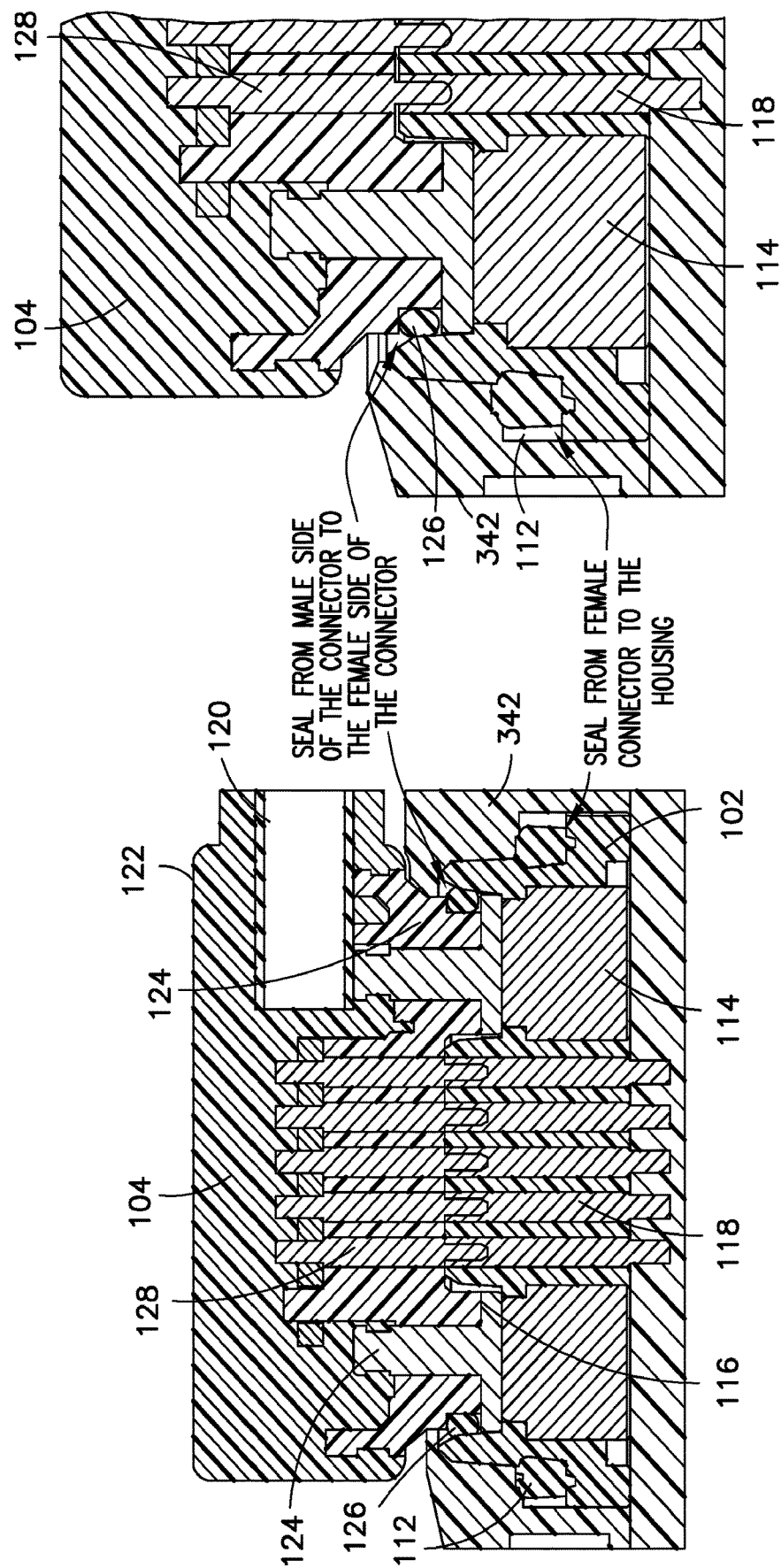

REVERSIBLE POWER AND DATA CONNECTOR ASSEMBLY

CROSS-REFERENCE TO RELATED APPLICATIONS

This application claims the benefit of priority to U.S. Provisional Patent Application No. 62/365,125, entitled, REVERSIBLE POWER AND DA TA CONNECTOR ASSEMBLY, which was filed on Jul. 21, 2016. The disclosure of the prior application is incorporated by reference herein in its entirety.

FIELD OF THE INVENTION

This disclosure relates to a power and data connector assembly and, more particularly, relates to a power and data connector assembly that is reversible (i.e., where the two connectors involved can be connected together in any one of at least two different orientations).

BACKGROUND

An electrical connector is an electro-mechanical device used to join electrical terminations to create an electrical circuit. Generally speaking, each electrical connection consist of a male-style connector (e.g., a plug) mated with a female-style connection (e.g., a socket).

There are many different types of electrical connectors and they can be classified or described in a variety of different ways, including, for example, by their pinout design, physical configuration, overall size, contact resistance, insulation between pins, ruggedness, resistance to vibration, resistance to entry of water and/or other contaminants, resistance to pressure, reliability, number of connect/ disconnect operations before failure, ease of connecting and disconnecting, etc.

Electrical connectors can be used in a variety of different applications and locations.

SUMMARY OF THE INVENTION

In one aspect, a system includes a first electrical connector and a first multiplexer. The first electrical connector has multiple electrical contacts including at least a first data contact, a second data contact, a first power contact, and a second power contact. The first multiplexer has a first data input, a second data input and a selector. The first data input is coupled to the first data contact. The second data input is coupled to the second data contact. The selector is coupled to the first power contact or the second power contact. The first multiplexer is configured to: direct the first data input to a first bus and direct the second data input to a second bus, or direct the first data input to the second bus and direct the second data input to the first bus, depending whether a voltage is present at the selector.

In another aspect, a method includes, directing data signals arriving at an electrical component via a reversible electrical connector assembly in a manner that depends on a position of a voltage signal at one or more of the contacts on the electrical connector assembly.

In some implementations, one or more of the following advantages are present.

For example, a power and data connector assembly is easy to connect because the specific orientation of the two connectors is not critical to proper system operation. This can be particularly advantageous in situations where the connection needs to be made (or unmade) in difficult-to-access places. Additionally, the connector assembly is very robust (e.g., waterproof, or weatherproof). It also holds together well (e.g., because of the use of magnets), but comes apart relatively easily (e.g., due to the spring-loaded, i.e., pogo-style, pin design). Moreover, the connector assembly is able to transfer power and data simultaneously.

Other features and advantages will be apparent from the description and drawings, and from the claims.

BRIEF DESCRIPTION OF THE DRAWINGS

FIGS. 5A and 5B are cross-sectional views showing an exemplary arrangement that includes a first electrical connector mated to a second electrical connector.

Like reference numerals refer to like elements.

DETAILED DESCRIPTION

Figure 1:
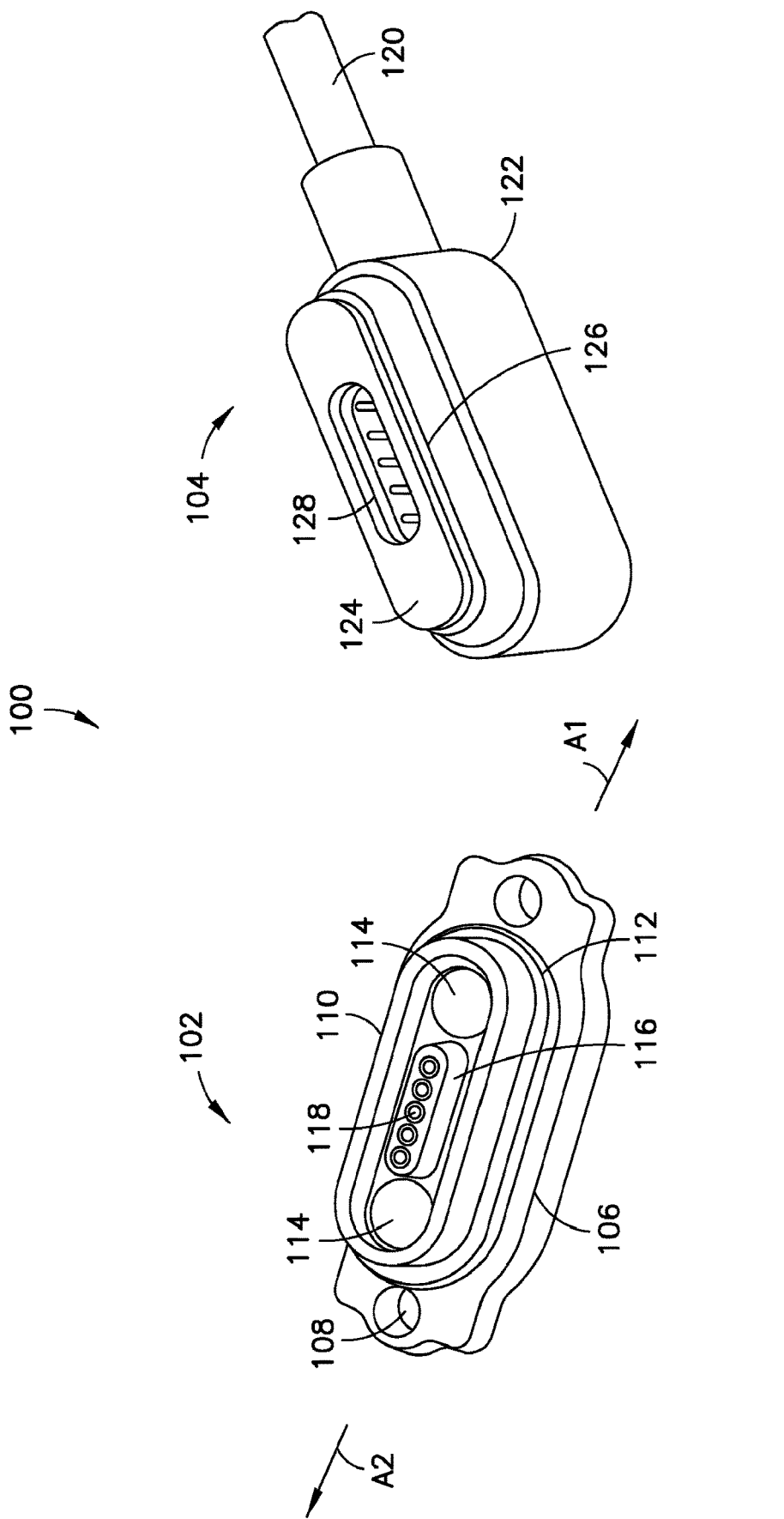
FIG. 1 is a partial perspective view of an exemplary connector assembly that includes a first electrical connector and a second electrical connector.

This disclosure relates to systems that include a connector assembly having a first electrical connector and a complementary second electrical connector. Each electrical connector has multiple electrical contacts that collectively facilitate the delivery of both power and data through the connector assembly. The arrangement of the electrical contacts and the physical configuration of each electrical connector allows for the first electrical connector and the second electrical connector to be joined together in any one of at least two different physical orientations.

In a typical implementation, the first electrical connector may be part of an electrical component (e.g., a battery-powered security camera, or the like), and exposed at an external surface of the electrical component. Moreover, in a typical implementation, the second electrical connector may be a connector at the end of cable (e.g., a USB-style cable). This USB-style cable may be used to plug the electrical component into a USB port of a computer, for example, for charging the electrical component and/or for transferring data into or out of the electrical component.

Generally speaking, the systems disclosed herein are configured so that any power and data that is delivered through the connector assembly (i.e., the first and second electrical connectors when connected) is automatically routed to an appropriate destination (e.g., within the electrical component) regardless of how the second electrical connector is oriented relative to the first electrical connector when connected. Thus, if data and power may be delivered to different contacts on the first electrical connector depending on the relative orientation of the second electrical connector, the system (e.g., the security camera) will automatically adjust to ensure that the power and data is appropriately routed inside the camera.

The connector assembly can be waterproof or weatherproof, having integral sealing provisions, and may include one or more magnetic components that facilitate connecting the first and second electrical connectors and/or to help maintain a secure connection between the first and second electrical connectors when connected.

The contacts of the connector assembly may be pogo-style contacts. In general, a pogo-style contact is a particular type of spring loaded contact that provides reliable, usually temporary, electrical connection between electrical parts, even in rigorous environments, such as the outdoors.

Advantageously, in a typical implementation, the present disclosure provides for a highly reliable connector assembly for delivery of power and data between electrical parts. Moreover, the connector assembly may be reversible, meaning, for example, that the two parts of the assembly (e.g., a first electrical connector and a second electrical connector) can be connected together with the parts in any one of more than one physical orientation. The power and data is delivered to appropriate destinations (e.g., within the electrical component) regardless of how the electrical connectors are physically oriented relative to each other when connected.

A typical combination of such features, and various sub-combinations thereof, may be highly desirable in a variety of applications, such as in battery-powered security cameras, or the like, that may be installed in difficult to reach places and that may need to be at least periodically plugged into a USB-style cable for recharging and/or data transfer purposes. The reversibility of the connectors and the magnetic components help make the electrical connectors easy to connect, which may be particularly important if the connector assembly may be installed in a difficult-to-reach place. The sealed nature of the resulting electrical connection, the magnetic features and the pogo-style connectors all help ensure a long life and continued proper operation of the connector assembly even in rigorous environments.

FIG. 1 is a partial perspective view of an exemplary connector assembly 100 that includes a first electrical connector 102 and a second electrical connector 104.

Though not shown in FIG. 1, in a typical implementation, the first electrical connector 102 would be physically attached to and exposed at an external surface of an electrical component (e.g., a battery-powered security camera, or the like). The second electrical connector 104, as shown in the illustrated implementation, is attached to the end of a cable 120 (e.g., a USB-style cable).

The connector assembly 100 is reversible, which, according to the illustrated implementation, means that the second electrical connector 104 can be connected to the first electrical connector 102 in any one of multiple orientations: a) with the cable 120 extending in a direction represented by arrow A1, or b) with the cable 120 extending in a direction represented by arrow A2. It should be noted that certain contacts on the second electrical connector 104 will touch different contacts on the first electrical connector 102 depending on which of these orientations is used. Thus, power and/or data may be delivered into different contacts of the first electrical connector 102 depending on the specific orientation of the second electrical connector 104 relative to the first electrical connector 102. As discussed herein, however, the system is generally adapted to ensure that any such power or data is routed to the appropriate destination regardless of the specific orientation used.

The first electrical connector 102 has a base portion 106 with a pair of mounting holes 108 that extend through the base portion 106. The mounting holes 108 are configured to receive mounting screws, or the like, that can be used to secure the first electrical connector 102 to an electrical component.

There is a projection that extends out of the base portion 106 of the first electrical connector 102 to define a wall 110 that is shaped substantially like an obround (or like the cross-section of a capsule). A gasket 112 is provided around the wall 110 where the wall and the base portion 106 meet.

There is a flat surface inside the wall 110 that is recessed relative to the top of the wall 110. There are two magnetic components 114 (e.g., magnets) embedded in this flat surface. In a typical implementation, these magnetic components 114 help make it easy to connect the second electrical connector 104, which has magnetically attractive parts, to the first electrical connector 102.

There is a contact platform 116, with a plurality of electrical contacts 118 that extends in an upward direction from the center of the flat surface in the first electrical connector 102. The contact platform 116 in the illustrated implementation is shaped substantially like an obround (or like the cross-section of a capsule), too. The electrical contacts 118 are exposed at a top or distal surface of the contact platform 116 for connection to other electrical contacts (e.g., the electrical contacts on the second electrical connector 104).

In the illustrated example, there are five electrical contacts 118 and all five are arranged along a common line and are substantially evenly-spaced. Moreover, in the illustrated implementation, all of the electrical contacts 118 are female pogo-style electrical contacts.

In a typical implementation, each respective one of the electrical contacts 118 is designated for a particular purpose. In one such exemplary implementation, the two outermost electrical contacts are power contacts (either one of which, but typically not both, can be used for the delivery of electrical power to the electrical component), the middle contact 118 is a ground contact, and the two other electrical contacts are data contacts (e.g., to collectively deliver a differential data signal, e.g., from a twisted pair of data lines in a USB-style cable to the electrical component). Thus, the order of electrical contacts in the first electrical connector, from end to end, may be: power, data, ground, data, and power.

Typically, when mounted to the electrical component (not shown in FIG. 1), the base portion 106 of the first electrical connector 102 might sit inside the housing of the electrical component and the wall 110 might extend through an opening in the housing of the electrical component, with the gasket 112 creating a seal against at least an inner surface of the housing.

The second electrical connector 104 is physically attached to the end of a cable 120 (e.g., a USB-style cable). USB, short for Universal Serial Bus, refers to an industry standard that defines the cables, connectors and communications protocols used in a bus for connection, communication, and power supply between computers, electronic devices, for example. Generally speaking, a USB-style cable is any kind of cable that utilizes, is based on, or is similar to USB technology, and that is able to deliver power and data to a destination.

The second electrical connector 104 has a base portion 122 that is shaped substantially like an obround (or like the cross-section of a capsule). A projection portion 124 extends from the base portion 122 and has a similar, but somewhat smaller, shape (also substantially like an obround, or like the cross-section of a capsule).

A gasket 126 is provided around the projection portion 124 and near a distal end of the projection portion 124. The gasket 126 is configured to seal, when the second electrical connector 104 is attached to the first electrical connector 102, against an inner surface of wall 110 on the first electrical connector 102.

There is a flat surface at a distal end of the projection portion 124. In a typical implementation, this flat surface is made of a material that is magnetic and/or attractive to the magnets 114 in the first electrical connector 102.

There is a recess 126 in the flat, distal surface of the projection portion 124. The recess 126 is also shaped substantially like an obround (or like the cross-section of a capsule). There are multiple electrical contacts 128 exposed within the recess 126 for connection to other electrical contacts (e.g., the electrical contacts on the first electrical connector 102).

In the illustrated example, there are five electrical contacts 128 and all five are arranged along a common line and substantially evenly-spaced. Moreover, in the illustrated implementation, all of the electrical contacts 128 are male pogo-style electrical contacts.

In a typical implementation, each respective one of the electrical contacts 128 in the second electrical connector 104 is designated for a particular purpose. In one such exemplary implementation, at least one of the two outermost electrical contacts is a power contact (and can be used to deliver electrical power), the middle contact is a ground contact, and the two other electrical contacts are data contacts (and can be used to deliver a differential data signal from a twisted pair of data lines in the USB-style cable 120, for example). Thus, the order of electrical contacts, from end to end in the illustrated example, is: power (possibly), data, ground, data, and power (possibly).

The first electrical connector 102 and the second electrical connector 104 are configured so that, when connected to one another, the extension portion 124 of the second electrical connector 104 extends into the space defined by the wall 110 of the first electrical connector 102, the electrical contacts 128 on the second electrical connector 104 engage the contacts 118 on the first electrical connector 102, and the gasket 126 forms a seal between the outer surface of the extension portion 124 and the inner surface of the wall 110.

Figure 2:
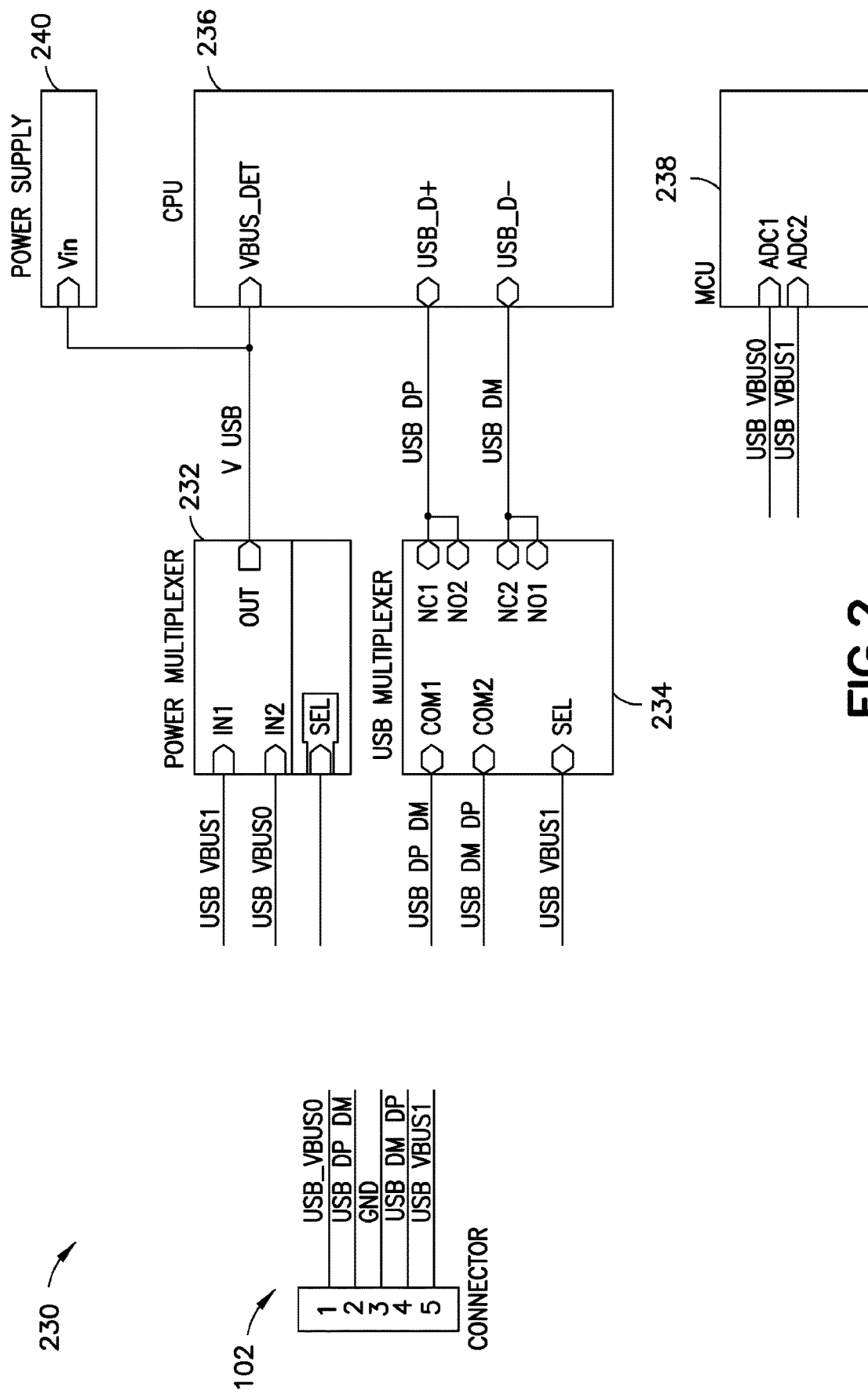
FIG. 2 is a partial schematic representation of an exemplary electrical component that includes the first electrical connector and internal circuitry.

FIG. 2 is a partial schematic representation of an exemplary electrical component 230 (e.g., a battery-powered security camera) that includes the first electrical connector 102 of FIG. 1 and various internal circuitry. The internal circuitry in the illustrated implementation includes a power multiplexer 232, a USB multiplexer 234, a power supply 240, a central processing unit (CPU) 236, and a microcontroller unit (MCU) 238. As mentioned above, the first electrical connector 102 is generally configured to accommodate the second electrical connector 104 in any one of two possible orientations. Moreover, depending on the specific orientation, certain contacts from the second electrical connector 104 will touch different contacts on the first electrical connector 102. For example, in the different orientations, the data contacts may be swapped (e.g., between contacts 2 and 4), and power may be delivered to contact 1 or contact 5, but generally not both.

Generally speaking, the internal circuitry is adapted to ensure that electrical power and data are routed appropriately to ensure proper operation of the electrical component 230 regardless of how the second electrical connector might be oriented when it is connected to the first electrical connector 102.

The first electrical connector 102 in the illustrated implementation has five electrical contacts 118. These electrical contacts are numbered 1-5 and respectively correspond to each of the five contacts 118 shown in FIG. 1 in one order from end to end. In the illustrated example, the two outermost electrical contacts 1 and 5 are power (voltage) contacts (either one of which, but generally not both, may be used to deliver electrical power into the electrical component 230). The middle contact 3 is a ground contact. Contacts 2 and 4 are differential data contacts and are configured to receive differential data (e.g., from a twisted pair of data lines in a USB-style cable).

In the illustrated implementation, contact 1 is connected to a first internal power bus USB_VBUS0, contact 2 is connected to a first internal data bus USB_DP_DM, contact 3 is connected to an internal ground bus GND, and contact 4 is connected to a second internal data bus USB_DM_DP, and contact 5 is connected to a second internal power bus USB_VBUS1. Generally speaking, in operation, voltage will appear at either the first internal power bus USB_VBUS0 or the second internal power bus USB_VBUS1, but not both, depending on the specific orientation of a connected second electrical connector.

The power multiplexer 232 can be virtually any kind of electronic circuitry that is configured to select one of several input signals and forward the selected input signal to a single output, for example. In the illustrated implementation, the power multiplexer 232 is a two-input, one-output power multiplexer.

The power multiplexer 232 has a first input terminal IN1, a second input terminal IN2, a select terminal (SEL), and an output terminal OUT. The first input terminal IN1 is connected to the second internal power bus USB_VBUS1, and the second input terminal IN2 is connected to the first internal power bus USB_VBUS0. The select terminal (SEL) can be connected to either the first internal power bus USB_VBUS0 or the second internal power bus USB_VBUS1. The output terminal OUT is connected to a power supply/CPU power bus V_USB.

The power supply 240 can be virtually any kind of electronic device that is able to supply electrical energy to an electric load (e.g., represented by other sub-components of 230, not shown in FIG. 1). The primary function of the power supply is to convert one form of electrical energy (i.e., the voltage it receives) to another that is usable by the various sub-components of component 230. The illustrated power supply 240 has a voltage input terminal $V_{IN}$.

In the illustrated implementation, the voltage input terminal $V_{IN}$ of the power supply 240 is connected to the power supply/CPU power bus V_USB.

The USB data multiplexer 234 can be virtually any kind of electronic circuitry that is configured to select one, or more, of several input signals and forward the selected input signal(s) to the outputs, for example. In a simple example, the USB data multiplexer 234 may include internal switches (e.g., normally open or normally closed switches) that can switch based on the presence or absence of specified voltage(s) at one or more select terminals. The USB data multiplexer 234, in the illustrated implementation, is a low power, dual, single pole, double throw two-port high speed switch.

The USB data multiplexer 234 has a first input terminal COM1, a second input terminal COM2, a select terminal SEL, a first output terminal NC1, a second output terminal NO2, a third output terminal NC2, and a fourth output terminal NO1.

At the input side of the USB multiplexer 234, input terminal COM1 is connected to the first data bus USB_DP_DM, and input terminal COM2 is connected to the second data bus USB_DM_DP. The select terminal SEL is connected to the second internal power bus USB_VBUS1.

At the output side of the USB multiplexer 234, the first output terminal NC1 and the second output terminal NO2 are connected together and connected to a first CPU data bus USB_DP. Also at the output side of the USB multiplexer 234, the third output terminal NC2 and the fourth output terminal NO1 are connected together and connected to a second CPU data bus USB_DM.

The CPU 236 can be virtually any kind of CPU. Generally speaking, a CPU is electronic circuitry that carries out instructions of a computer program by performing various operations specified by the instructions. The CPU in the illustrated implementation has a power terminal VBUS_DET, a positive data terminal USB_D+, and a negative data terminal USB_D−.

The power terminal VBUS_DET of the CPU 236 is connected to the power supply/CPU power bus V_USB. The positive data terminal USB_D+ of the CPU 236 is connected to the first CPU data bus USB_DP. The negative data terminal USB_D− of the CPU 236 is connected to the second CPU data bus USB_DP.

The microcontroller unit (MCU) 238 can be virtually any kind of MCU. Generally speaking, an MCU is a small computer on a single integrated circuit containing a processor core, memory, and programmable input/output peripherals. Program memory is often included on chip, as well as a typically small amount of random access memory (RAM). Microcontrollers are generally designed for embedded applications, and may be used in automatically controlled products and devices.

The illustrated MCU 238 has a first terminal ADC1 and a second terminal ADC2. The first terminal ADC1 on the MCU 238 is connected to the first internal power bus USB_VBUS0, and the second terminal ADC2 on the MCU 238 is connected to the second internal power bus USB_VBUS1.

As discussed below, regardless of second electrical connectors orientation (and regardless, therefore, of whether voltage is being delivered to USB_VBUS0 or USB_VBUS1—generally, it will not be both), voltage will be delivered to both the input terminal $V_{IN}$ of the power supply 240 and to the VBUS_DET terminal on the CPU 236. In this regard, the power multiplexer 232 is operationally configured to output automatically the voltage at input terminal IN1 or the voltage at input terminal IN2. In a typical implementation, the power multiplexer would output either the IN1 voltage or the IN2 voltage depending, for example, on whether a voltage is present at the power multiplexer's select terminal (SEL). Moreover, in a typical implementation, regardless of whether voltage is being delivered to USB_VBUS0 or USB_VBUS1, voltage will be output to the power supply/CPU power bus V_USB and reach both the input terminal $V_{IN}$ on the power supply and the VBUS_DET terminal on the CPU.

Additionally, and perhaps more significantly, regardless of second electrical connectors orientation (and regardless, therefore, of the specific orientation of the differential data signals being delivered to internal data bus USB_DP_DM and internal data bus USB_DM_DP), the differential data signal is appropriately routed, to the correct terminals (USB_D+ and USB_D− on the CPU 236) with the correct polarity. In this regard, the USB multiplexer 234 essentially uses the presence (or absence) of voltage at a particular one of the power contacts at the first electrical connector 102 (or bus USB_VBUS1), as sensed at selector terminal SEL, to implicitly determine the orientation of the second electrical connector 104 relative to the first electrical connector 102.

From that, the USB multiplexer 234 can effectively reverse the polarity of the differential data signals, if needed, for delivery to the CPU, or not.

If, for example, the second electrical conductor were connected to the first electrical connector 102 in a manner that did not require the multiplexer to reverse data polarity (i.e., so that the input intended for the positive data input terminal USB_D+ of the CPU ends up at contact 2 of the first electrical connector 102 and the input intended for the negative data input terminal USB_D− of the CPU ends up at contact 4 of the first electrical connector 102), then there would be a voltage at contact 1 of the first electrical connector 102, but no voltage at contact 5 of the first electrical contact 102.

In this example, the select terminal SEL of the USB multiplexer 234 would not receive a voltage signal (because it is electrically connected to contact 5, which, in this example, has no voltage). The internal switches of the USB multiplexer 234 would remain in their respective normal (i.e., no voltage at the selector terminal SEL) positions—that is, the normally open switches would remain open and the normally closed switches would remain closed. As such, the data presented at the input terminals COM1, COM2 would pass through the normally closed internal switches of the USB multiplexer 234 to the output terminals NC1, NC2, respectively. Furthermore, that data would continue to pass, along buses USB_DP and USB_DM, respectively, into the data terminals USB_D+ and USB_D−, respectively, at the CPU 236, with appropriate polarity.

If, on the other hand, the second electrical conductor were connected to the first electrical connector 102 in a manner that did require the multiplexer to reverse polarity (i.e., so that the input intended for the positive data input terminal USB_D+ of the CPU ends up at contact 4 of the first electrical connector 102 and the input intended for the negative data input terminal USB_D− of the CPU ends up at contact 2 of the first electrical connector 102), then there would be a voltage at contact 5 of the first electrical connector 102, but no voltage at contact 1 of the first electrical contact 102.

In this example, the select terminal SEL of the USB multiplexer 234 would receive a voltage signal (because it is electrically connected to contact 5, which, in this example, has voltage). The internal switches of the USB multiplexer 234, therefore, would switch out of their respective normal (i.e., no voltage at the selector terminal SEL) positions—that is, the normally open switches would switch to being closed and the normally closed switches would switch to being open. As such, the data presented at the input terminals COM1, COM2 would pass through the normally open (but now closed) internal switches of the USB multiplexer 234 to the output terminals NC2, NC1, respectively. Furthermore, that data would continue to pass, along buses USB_DP and USB_DM, respectively, into the data terminals USB_D+ and USB_D−, respectively, at the CPU 236, with appropriate polarity.

Additionally, in the illustrated implementation, voltage would flow from whichever contact (1 or 5) on the first electrical connector 102 that ends up being connected to a voltage source, onto internal power bus USB_VBUS0 or USB_VBUS1, and into either ADC1 or ADC2 on the MCU 238.

Figure 3:
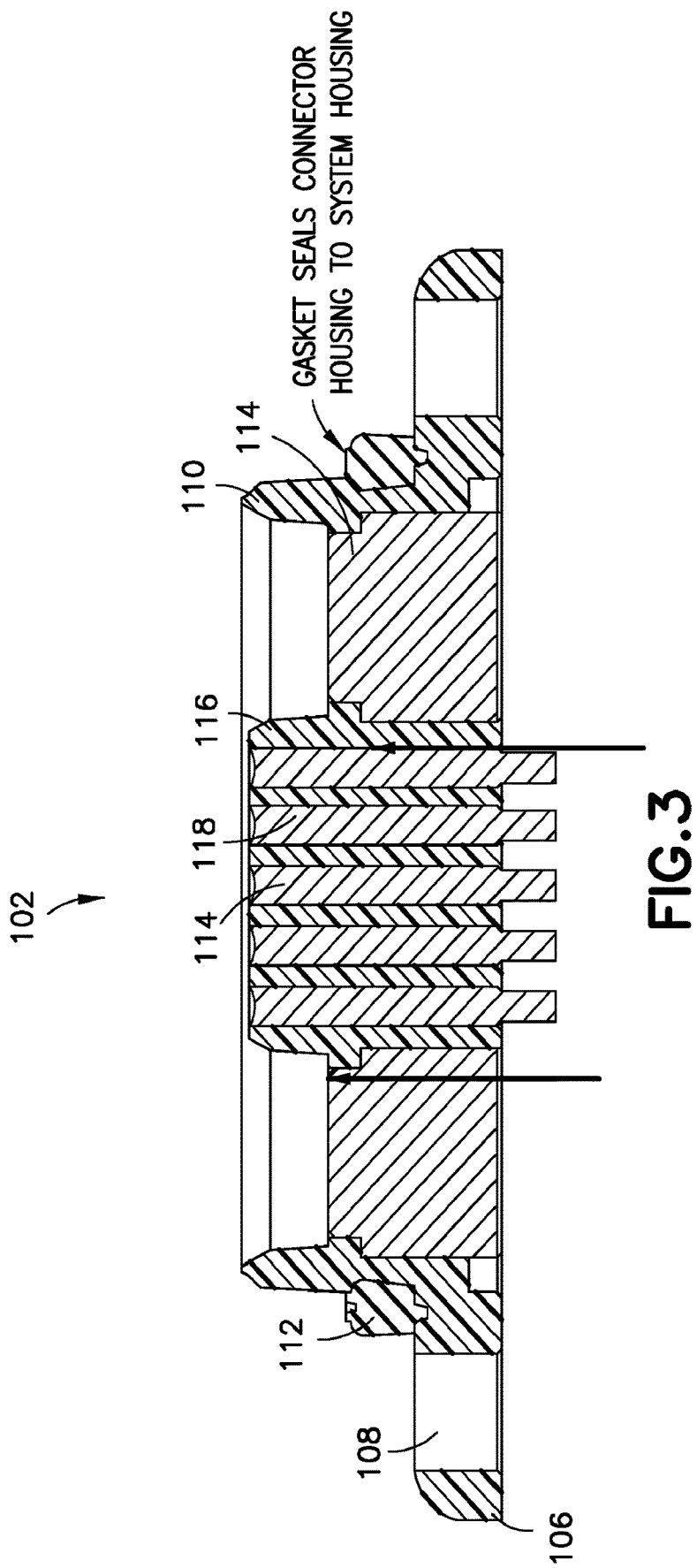
FIG. 3 is a partial cross-sectional view of an exemplary first electrical connector.

FIG. 3 is a partial cross-sectional view of the exemplary first electrical connector 102 in FIG. 1.

The first electrical connector 102 has a base portion 106 with a pair of mounting holes 108 that extend through the base portion 106. There is a projection that extends out of the base portion 106 of the first electrical connector 102 to define a wall 110. A gasket 112 is provided around the wall 110 where the wall and the base portion 106 meet. There is a flat surface inside the wall 110 that is recessed relative to the top of the wall 110. There are two magnetic components 114 (e.g., magnets) embedded in this flat surface. There is a contact platform 116 that extends in an upward direction from the flat surface. There are five, in-line, evenly-spaced, female, pogo-style electrical contacts 118 exposed at a top (distal) surface of the contact platform 116. The contact platform 116 in the illustrated implementation is shaped substantially like an obround (or like the cross-section of a capsule), too. The electrical contacts 118 are exposed at a top or distal surface of the contact platform 116 for connection to other electrical contacts (e.g., the electrical contacts on the second electrical connector 104).

Figure 4:
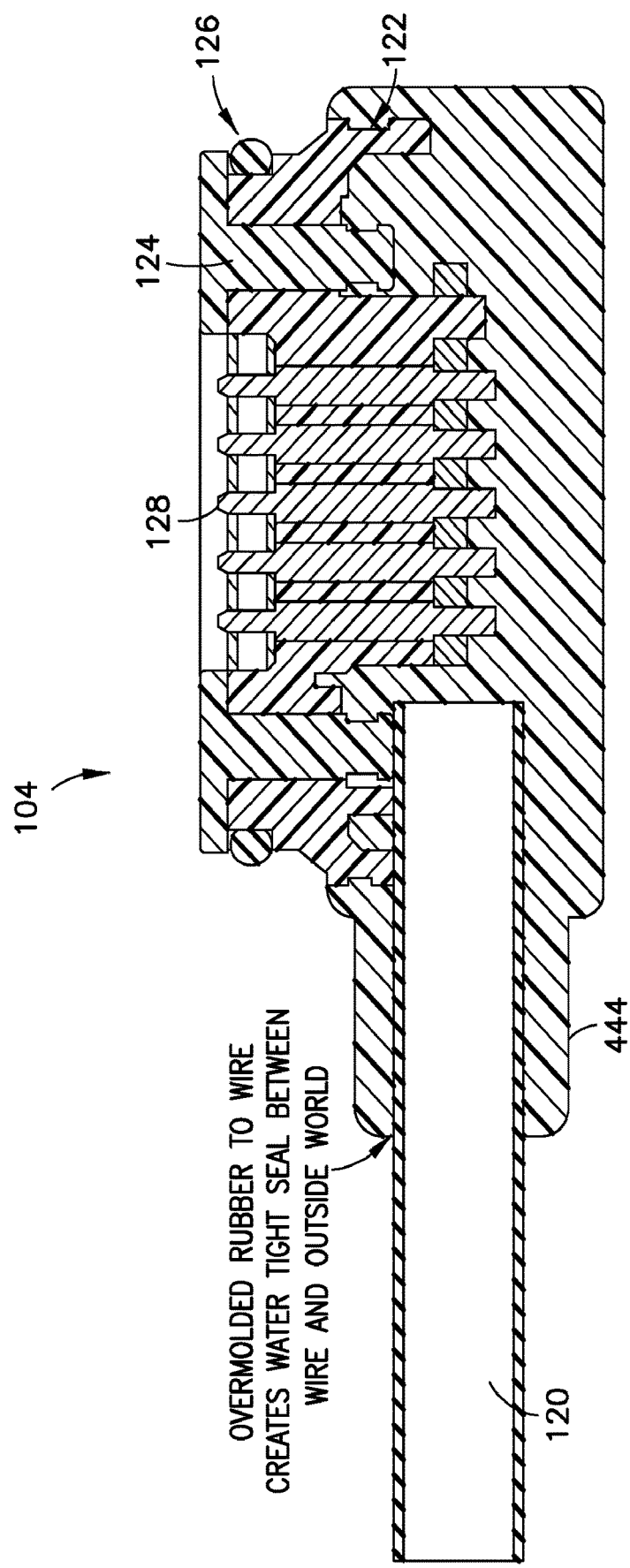
FIG. 4 is a partial cross-sectional view of the exemplary second electrical connector.

FIG. 4 is a partial cross-sectional view of the exemplary second electrical connector 104 in FIG. 1.

The second electrical connector 104 is physically attached to the end of a cable 120 (e.g., a USB-style cable). An overmold 444 made of rubber, or the like, is provided at the interface of the cable 120 and the second electrical connector 104 and essentially creates a water tight seal at that interface. The second electrical connector 104 has a base portion 122 and a projection portion 124 that extends from the base portion 122. A gasket 126 is provided around the projection portion 124 and near a distal end of the projection portion 124. There is a flat surface at a distal (top) end of the projection portion 124. This flat surface is made of a material that is magnetic and/or attractive to the magnets 114 in the first electrical connector 102. There is a recess 126 in the flat, distal surface of the projection portion 124. There are five, evenly-spaced, in-line, male, pogo-style electrical contacts 128 exposed within the recess 126.

FIGS. 5A and 5B are cross-sectional views showing an exemplary arrangement of a first electrical connector 102 connected to a second electrical connector.

In the illustrated implementation, the first electrical connector 102 is inside and mounted to a housing 542 of an electrical component (e.g., a battery powered security camera, or the like). A portion of the first electrical connector 102 (including the contacts 118 and the magnets 114) are exposed through an opening in the housing for connection to the second electrical connector 104.

The gasket 112 that extends around the wall 110 of the first electrical connector 102 is pressed and creates a seal against an inner surface of the housing 342.

Additionally, the gasket 126 that extends around the projection portion 124 of the second electrical connector 104 is pressed and creates a seal against an inner surface of the wall 110 of the first electrical connector 110.

The pogo-style electrical contacts 118 and 128 on the first and second electrical connectors 102, 104 are engaged to one another.

The magnets 114 on the first electrical connector 102 are positioned close to (or in contact with), and is attracting, the flat surface 124 of the second electrical connector 104.

Figure 6A:
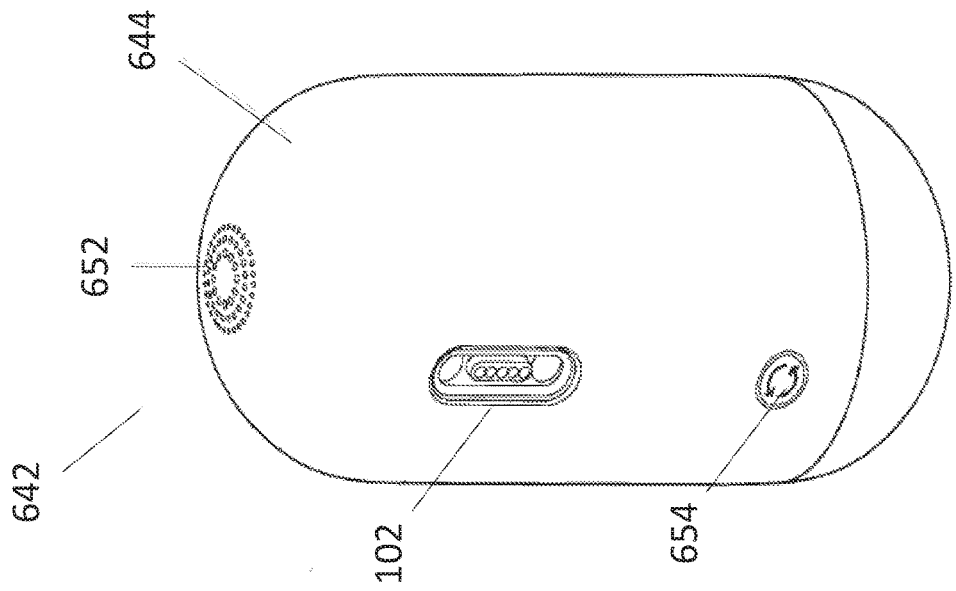
FIGS. 6A and 6B are perspective views of an exemplary electrical component that includes an exemplary first electrical connector and associated internal circuitry.
Figure 6B:
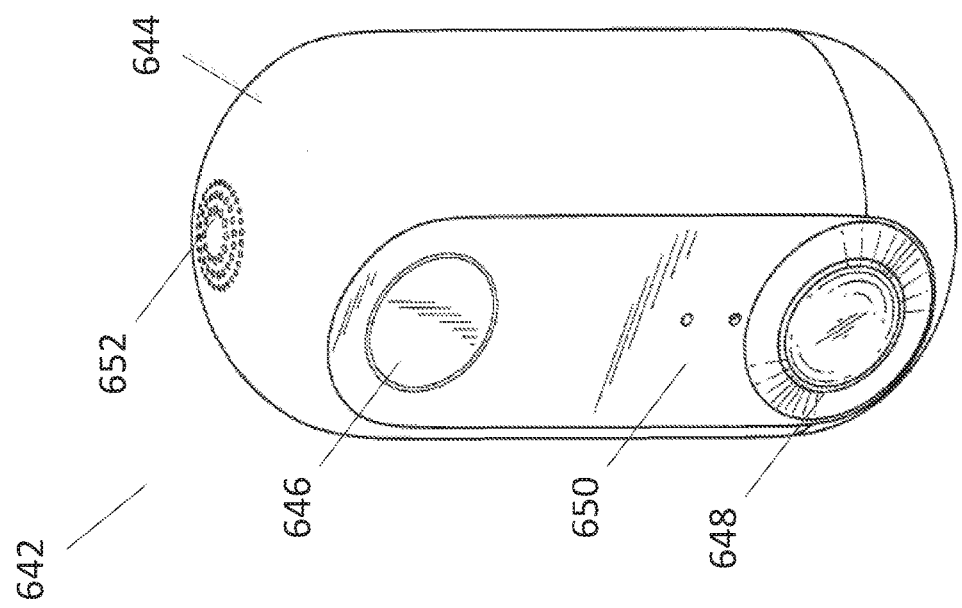

FIGS. 6A and 6B are perspective views of an exemplary electrical component 642 that includes an exemplary first electrical connector and associated internal circuitry.

The electrical component in the illustrated example is a battery-operated security camera 642 with an internal, rechargeable battery.

The security camera 642 has a housing 644 that is substantially oblong and capsule-shaped with a flat front surface. There are optical elements exposed at the flat front surface of the housing 644 and an audio element at the top of the housing 644. In a typical implementation, the upper optical element 646 is a camera lens (for an internal camera), the lower optical element 648 is a lens (for an internal motion sensor), and at least one of the middle optical elements 650 is a lens (for an internal ambient light sensor). In a typical implementation, the audio element at the top of the housing is a speaker 652.

There is a button 654 at rear surface of the security monitoring device 102 opposite the flat front surface. The button 654 may be pressed by a user, for example, to prompt start-up of the device or to prompt the device to take some kind of action. In a typical implementation, this single, simple button may be the only type of user interface component on the security camera 642.

Generally speaking, the security camera is configured to collect data (e.g., images, video and/or sound) from a monitored physical location (i.e., wherever the security monitoring device ends up being located). In some implementations, the security monitoring device is Bluetooth®-enabled and/or Wi-Fi enabled.

The first electrical connector 102 is shown exposed at the rear surface of the security camera (in FIG. 6B). The first electrical connector 102 in the illustrated example, may be used to charge the device and to pass along device-related data. It also may be used in connection with manufacturing, programming and/or initial set-up, or troubleshooting. And so, diagnostic data, for example, may come through the first electrical connector 102 as well.

A number of embodiments of the invention have been described. Nevertheless, it will be understood that various modifications may be made without departing from the spirit and scope of the invention.

For example, the precise physical configuration of the first and second electrical connectors can vary considerably, as long as they are able to be connected to each other in more than one orientation.

The precise pin out (or configuration of contacts) in each of the first and second electrical connectors can vary as well. For example, some implementations can include more than one pair of data contacts and, in those implementations, there may be more than five contacts (e.g., there may be seven, nine, or more). Also, there may, of course, be an even number of contacts. Additionally, the precise order of contacts from end to end in each of the first and second electrical contacts can vary as well. For example, if there are five contacts, the order of contact-types (from one end to the other) may be: 1) data, power, ground, power data, or 2) power, data, ground, data, power, and 3) a variety of other possibilities.

The buses, or other electrical connections or couplings, disclosed herein can be virtually any kind of direct, or indirect conductive path (e.g., wires, traces, contacts, vias, etc.) that allows the flow of electrical energy, whether power voltage or data. Additionally, the concept of coupling or being connected, as used herein, should be construed broadly to include any kind of connection or coupling, whether directly or indirectly (e.g., via other circuit components, etc.).

The contacts disclosed herein are arranged in line (i.e., along a common line. However, in some implementations, the contacts may be arranged in other ways (e.g., in an array) and there may be more than two different ways (orientations) that the connectors can be connected in. In those implementations, the position (i.e., contact) where the voltage arrives may be used (e.g., by one or more multiplexers) to route the data signals appropriately.

Certain terminals, buses and the like have been described herein as input or output buses. This terminology was used for convenience only and should not be construed as limiting. Indeed, in many instances an input terminal or bus may be used for input or output. Similarly, an output terminal or bus may be used for output or input.

The magnets and/or magnetic materials can take on a variety of different configurations. Indeed, in some instances only one magnet may be present. In other implementations, more than two magnets may be present. In some implementations, any magnet(s) may be in the second electrical connector and not the first. In some implementations, there may be one or more magnets in each of the first and second electrical connectors. In some implementations, the magnets may be omitted entirely.

The seals can be created in a variety of different ways and, in some implementations, may be omitted entirely.

The specific type of pins or contacts may be pogo-style pins (as described herein), or virtually any kind of electrical contacts.

The CPU 236 and the MCU 238 have been described as different components. However, they and/or their respective functionalities can be combined or incorporated into one single component.

USB cables are mentioned herein throughout as examples of a cable type that may be coupled to the connector described herein. Of course, the connector described herein could be connected to virtually any kind of cable that is able to carry both power and data.

It should be understood that any relative terminology used herein, such as "upper", "lower", "above", "below", "front", "rear," etc. is solely for the purposes of clarity in describing particular implementations and is not intended to limit the scope of what is described here to require particular positions and/or orientations. Accordingly, such relative terminology should not be construed to limit the scope of the present application.

In various embodiments, some of the subject matter disclosed herein can be implemented in digital electronic circuitry, or in computer-based software, firmware, or hardware, including the structures disclosed in this specification and/or their structural equivalents, and/or in combinations thereof. In some embodiments, some of the subject matter disclosed herein can be implemented in one or more computer programs, that is, one or more modules of computer program instructions, encoded on computer storage medium for execution by, or to control the operation of, one or more data processing apparatuses (e.g., processors).

Some of the operations described in this specification can be implemented as operations performed by a data processing apparatus (e.g., a processor) using data stored on one or more computer-readable storage devices or received from other sources. The term "processor" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and described herein as occurring in a particular order, this should not be understood as requiring that such operations be performed in the particular order shown or in sequential order, or that all illustrated operations be performed, to achieve desirable results. In certain circumstances, multitasking may be advantageous. Moreover, the separation of various system components in the embodiments described above should not be understood as requiring such separation in all embodiments, and it should be understood that the described components and systems can generally be integrated together in a single product or component or packaged into multiple different products or components.

Finally, the concepts disclosed herein can be implemented in connection with a wide variety of electrical components, especially ones in which it may be desirable to form a temporary connection to another component (e.g., a computer or the like for charging and/or data transfer). Some examples of these types of components include: battery-powered cameras, security or safety monitors, sensors of any one or more of the following: light, power, temperature, RF signals, scheduling, time, sound, vibration, motion, pressure, voice, proximity, occupancy, location, velocity, safety, security, fire, smoke, messages, medical conditions, identification signals, humidity, barometric pressure, weight, traffic patterns, power quality, operating costs, power factor, storage capacity, distributed generation capacity, UPS capacity, battery life, inertia, glass breaking, flooding, carbon dioxide, carbon monoxide, ultrasound, infra-red, microwave, radiation, microbes, bacteria, viruses, germs, disease, poison, toxic materials, air quality, lasers, loads, load controls, etc.

Other implementations are within the scope of the claims.

What is claimed is:

1. A system comprising:
   a first electrical connector comprising a plurality of electrical contacts including at least a first data contact, a second data contact, a first power contact, and a second power contact;
   a first multiplexer comprising a first data input coupled to the first data contact, a second data input coupled to the second data contact, and a selector coupled to the first power contact or the second power contact, wherein the first multiplexer is configured to: direct the first data input to a first bus and direct the second data input to a second bus, or direct the first data input to the second bus and direct the second data input to the first bus, depending whether a voltage is present at the selector; and a first processor comprising a first data terminal and a second data terminal,
wherein the first data terminal is coupled to the first output of the multiplexer, and
wherein the second data terminal is coupled to the second output of the multiplexer.

2. The system of claim 1, wherein the first multiplexer further comprises:
a first data output (NC1) that is normally closed relative to the first data input;
a second data output (NO1) that is normally open relative to the first data input;
a third data output (NC2) that is normally closed relative to the second data input; and
a fourth data output (NO2) that is normally open relative to the second data input.

3. The system of claim 2, wherein the first data output (NC1) and the fourth data output (NO1) are connected together and form the first output of the multiplexer, and
wherein the second data output (NO1) and the third data output (NC2) are connected together are form the second output of the multiplexer.

4. The system of claim 2, wherein the multiplexer is configured to:
close a connection between the second data output (NO1) and the first data input;
close a connection between the fourth data output (NO2) and the second data input;
open a connection between the first data output (NC1) and the first data input; and
open a connection between the third data output (NC2) and the second data input,
in response to a voltage being present at the selector.

5. The system of claim 1, further comprising:
a second multiplexer comprising:
a first power input terminal, and
a second power input terminal,
wherein the first power input terminal of the second multiplexer is coupled to the first power contact of the first electrical connector, and
wherein the second power input terminal of the second multiplexer is coupled to the second power contact of the first electrical connector.

6. The system of claim 5, wherein the second multiplexer further comprises an output terminal, and
wherein the second multiplexer is operable such that a voltage at either one of the first or second power input terminals passes to the output terminal.

7. The system of claim 6, further comprising:
a first processor comprising a power terminal,
wherein the power terminal of the first processor is coupled to the output terminal of the second multiplexer.

8. The system of claim 1, further comprising:
a second electrical connector comprising a plurality of electrical contacts including at least a first data contact, a second data contact, a first power contact, and a second power contact,
wherein the first electrical connector is configured to accommodate the second electrical connector in any one of two different physical orientations.

9. The system of claim 8, wherein the electrical contacts on each of the first and second electrical connectors is arranged along a line.

10. The system of claim 8, wherein there are five electrical contacts on each of the first and second electrical connectors.

11. The system of claim 10, wherein the electrical contacts on each of the first and second electrical connectors includes: two data contact, two power contacts and a ground contact.

12. The system of claim 8, wherein the electrical contacts on the first and second electrical connectors are spring loaded electrical contacts.

13. The system of claim 12, further comprising:
a magnet to facilitate connecting the first and second electrical connectors and/or to help maintain a secure connection between the first and second electrical connectors when connected.

14. The system of claim 12, further comprising:
a gasket to form a seal between the first electrical connector and the second electrical connector when connected.

15. A system comprising:
a first electrical connector comprising a plurality of electrical contacts including at least a first data contact, a second data contact, a first power contact, and a second power contact; and
a first multiplexer comprising a first data input coupled to the first data contact, a second data input coupled to the second data contact, and a selector coupled to the first power contact or the second power contact,
wherein the first multiplexer is configured to: direct the first data input to a first bus and direct the second data input to a second bus, or direct the first data input to the second bus and direct the second data input to the first bus, depending whether a voltage is present at the selector, and
wherein the first multiplexer further comprises:
a first data output (NC1) that is normally closed relative to the first data input;
a second data output (NO1) that is normally open relative to the first data input;
a third data output (NC2) that is normally closed relative to the second data input; and
a fourth data output (NO2) that is normally open relative to the second data input.

16. The system of claim 15, wherein the first data output (NC 1) and the fourth data output (NO1) are connected together and form the first output of the multiplexer, and
wherein the second data output (NO1) and the third data output (NC2) are connected together are form the second output of the multiplexer.

17. The system of claim 15, wherein the multiplexer is configured to:
close a connection between the second data output (NO1) and the first data input;
close a connection between the fourth data output (NO2) and the second data input;
open a connection between the first data output (NC1) and the first data input; and
open a connection between the third data output (NC2) and the second data input,
in response to a voltage being present at the selector.

18. A system comprising:
a first electrical connector comprising a plurality of electrical contacts including at least a first data contact, a second data contact, a first power contact, and a second power contact;
a first multiplexer comprising a first data input coupled to the first data contact, a second data input coupled to the second data contact, and a selector coupled to the first power contact or the second power contact, wherein the first multiplexer is configured to: direct the first data input to a first bus and direct the second data input to a second bus, or direct the first data input to the second bus and direct the second data input to the first bus, depending whether a voltage is present at the selector; and a second multiplexer comprising:
a first power input terminal, and
a second power input terminal,
wherein the first power input terminal of the second multiplexer is coupled to the first power contact of the first electrical connector, and
wherein the second power input terminal of the second multiplexer is coupled to the second power contact of the first electrical connector.

19. The system of claim 18, wherein the second multiplexer further comprises an output terminal, and
wherein the second multiplexer is operable such that a voltage at either one of the first or second power input terminals passes to the output terminal.

20. The system of claim 19, further comprising:
a first processor comprising a power terminal,
wherein the power terminal of the first processor is coupled to the output terminal of the second multiplexer.

21. A system comprising:
a first electrical connector comprising a plurality of electrical contacts including at least a first data contact, a second data contact, a first power contact, and a second power contact;
a first multiplexer comprising a first data input coupled to the first data contact, a second data input coupled to the second data contact, and a selector coupled to the first power contact or the second power contact, wherein the first multiplexer is configured to: direct the first data input to a first bus and direct the second data input to a second bus, or direct the first data input to the second bus and direct the second data input to the first bus, depending whether a voltage is present at the selector; and a second electrical connector comprising a plurality of electrical contacts including at least a first data contact, a second data contact, a first power contact, and a second power contact, wherein the first electrical connector is configured to accommodate the second electrical connector in any one of two different physical orientations.

22. The system of claim 21, wherein the electrical contacts on each of the first and second electrical connectors is arranged along a line.

23. The system of claim 21, wherein there are five electrical contacts on each of the first and second electrical connectors.

24. The system of claim 23, wherein the electrical contacts on each of the first and second electrical connectors include: two data contact, two power contacts and a ground contact.

25. The system of claim 21, wherein the electrical contacts on the first and second electrical connectors are spring loaded electrical contacts.

26. The system of claim 25, further comprising:
a magnet to facilitate connecting the first and second electrical connectors and/or to help maintain a secure connection between the first and second electrical connectors when connected.

27. The system of claim 25, further comprising:
a gasket to form a seal between the first electrical connector and the second electrical connector when connected.

* * * * *